Dec. 8, 1942.   H. BAADE ET AL   2,304,621
POWER BRAKE
Filed Aug. 21, 1940   4 Sheets-Sheet 1

INVENTORS
HENRY BAADE
THOMAS H. THOMAS
BY
ATTORNEY

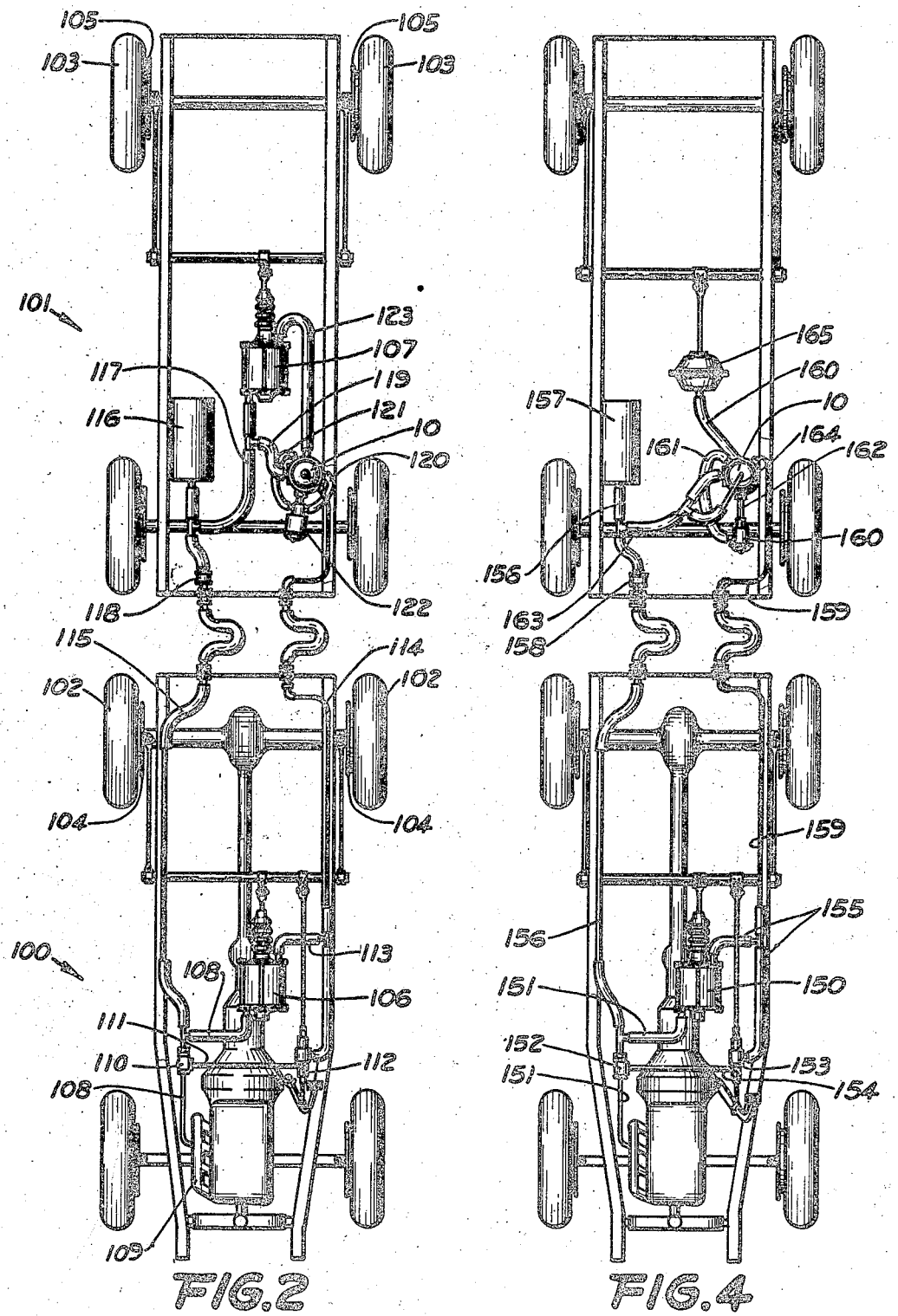

Dec. 8, 1942.  H. BAADE ET AL  2,304,621
POWER BRAKE
Filed Aug. 21, 1940  4 Sheets-Sheet 3

INVENTORS
HENRY BAADE
THOMAS H. THOMAS
BY
ATTORNEY

Dec. 8, 1942.    H. BAADE ET AL    2,304,621
POWER BRAKE
Filed Aug. 21, 1940    4 Sheets-Sheet 4

INVENTORS
HENRY BAADE
THOMAS H. THOMAS
BY
ATTORNEY

Patented Dec. 8, 1942

2,304,621

UNITED STATES PATENT OFFICE 2,304,621

POWER BRAKE

Henry Baade, Detroit, Mich., and Thomas H. Thomas, South Bend, Ind., assignors to Bendix Aviation Corporation, South Bend, Ind., a corporation of Delaware Application August 21, 1940, Serial No. 353,456

10 Claims. (Cl. 188—3)

This invention relates to fluid pressure brake systems, and more particularly to an improved control valve for fluid pressure brakes.

It is often desired to control one set of brakes in response to another. This is particularly true in a tractor and trailer combination where it is necessary to have adequate brakes for both vehicles and at the same time provide for control by the operator over the brakes of both vehicles.

In tractor and trailer braking combinations it is usually advantageous to provide a fluid pressure power motor for the tractor brakes and a second fluid pressure power motor for the trailer brakes. The operator then usually controls the tractor power motor which, in turn, controls the operation of the trailer power motor.

A power cylinder or motor designed to use vacuum power may be either one of two types—vacuum suspended in release or atmospheric suspended in release. It is therefore evident that a tractor-trailer power braking system may have any one of four power cylinder combinations—vacuum suspended on the tractor with vacuum suspended on the trailer, atmospheric suspended on the tractor with atmospheric suspended on the trailer, vacuum suspended on the tractor with atmospheric suspended on the trailer, and atmospheric suspended on the tractor with vacuum suspended on the trailer.

In any tractor-trailer power motor combination it is desirable and even necessary to provide a relay valve, located on the trailer near the trailer cylinder to be actuated by the pressure in the control line coming from the tractor and to itself actuate the trailer power motor. The relay, or speeding up function of the valve, is needed in all four of the above-mentioned combinations.

The vacuum tractor-atmospheric trailer and atmospheric tractor-vacuum trailer combinations both require an additional function from the relay or control valve. This additional function is the conversion of pressure impulses from the tractor cylinder into pressure which will actuate the trailer cylinder. The direction of the pressure change which occurs during brake application is thus changed between the tractor and trailer power motors.

The control valve which we have invented is capable of use with any of the four combinations, and has when used the relay function and the conversion function where necessary. Because of its adaptability we choose to call our valve a universal relay valve.

An important object of our invention is the provision of a universal relay valve which will operate to seal effectively and to accurately proportion the effective pressures of the associated power motors.

Our valve has the further advantage that, when combined with the proper power brake hookup, it will provide the automatic trailer braking upon breakaway required by the laws of several states.

Another advantage of our invention is that the valve elements which control the operation of the trailer power brakes are of the poppet type and are adapted to seal effectively when the openings controlled by them are closed.

Further objects, advantages, and features of our invention will be apparent in the course of the ensuing description. In the said description of a preferred form of our invention reference will be had to the accompanying drawings, in which:

Figure 2 shows diagrammatically a tractor-trailer brake hookup in which the power motor of the tractor is vacuum suspended and that of the trailer vacuum suspended;

Figure 4 shows a vacuum to atmospheric hookup;

Figure 1:
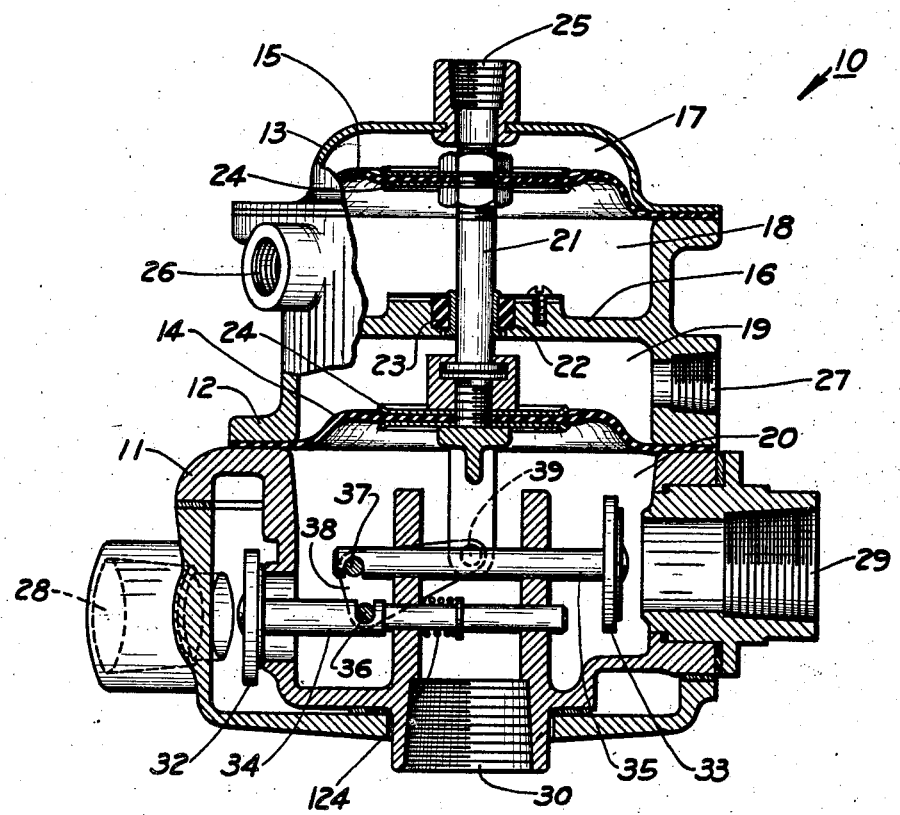
Figure 1 shows in elevation a section taken through a preferred form of our universal relay valve.

Proceeding now to a detailed discussion of the preferred embodiment, as shown, we find in Figure 1 a valve 10 having a lower casing 11 and an upper casing 12, the two parts being secured together by a plurality of bolts or other suitable securing means. A cover or cap element 13 is fastened to the upper casing 12 by any suitable means. A diaphragm 14 is secured between the elements 11 and 12 and a second diaphragm 15 is secured between the elements 12 and 13. An annular partition 16 integral with the element 12 divides into two parts the interior of the cylinder lying between diaphragms 14 and 15. The casing elements, diaphragms, and the partition thus divide the valve 10 into four chambers, 17, 18, 19, and 20, each of which is sealed from the others. A rod 21 is clamped to diaphragm 15 and extends downward through the partition 16 and the diaphragm 14. When the parts of the valve are operated the two diaphragms and the valve move together, the center of the rod moving upward or downward through the partition 16. Annular sealing elements 22 and 23 surround rod 21 where it passes through partition 16, effecting the sealing of chamber 18 from chamber 19. The element 22 also serves as a flexibly mounted bushing for the rod 21. The diaphragms 14 and 15 are each provided with washers 24 clamped against the diaphragms adjacent the rod 21, for further sealing the several chambers from each other.

Ports 25, 26, and 27 open respectively into the chambers 17, 18, and 19. Chamber 20 is provided with ports 28, 29, and 30. In each of the various power brake hookups hereinafter described, port 28 is open to atmosphere, preferably through an air cleaner, port 29 is connected to a source of vacuum, and port 30 is connected to the trailer power motor.

The ports 28 and 29 are adapted to be closed at times by poppet type valve elements 32 and 33. The movements of the valve elements 32 and 33 are controlled by their stems, 34 and 35 respectively, which in turn are attached by pins 36 and 37 to a triangular lever 38. A third pin 39 fixes one corner of the lever 38 to the lower end of the rod 21. Movement of the rod 21 will therefore move the lever 38 to alternately open and close the ports 28 and 29. It will be seen that downward movement of rod 21 will first actuate valve element 33 to close port 29 and then actuate valve element 32 to open port 28. Upward movement of rod 21 from its lowermost position will first close port 28 and then open port 29. It is to be noted that there is a position of rod 21 in which both ports 28 and 29 will be closed, this position being the lapped position of the valve.

The movements of the rod 21 are subject to control by two forces, the force applied by the pressure differential over diaphragm 14 and the force applied by the pressure differential over diaphragm 15. The relation of these two forces will determine the position and movement of rod 21.

The use of our improved valve in each of the several power brake hookups will now be described. Figure 2 illustrates its use in a vacuum suspended tractor-vacuum suspended trailer hookup. A tractor 100 and a trailer 101 are provided respectively with wheels 102 and 103 having associated therewith brakes indicated generally at 104 and 105. The tractor brakes 104 are adapted to be applied through suitable brake linkage by force supplied from a vacuum suspended power cylinder 106. A vacuum suspended power cylinder 107 is provided for actuating the trailer brakes 105. The front end of the tractor power cylinder 106 is connected by a conduit 108 to the manifold 109 of the tractor's internal combustion engine. A check valve 110 is interposed in the conduit 108. A conduit 111, branching from conduit 108 connects the manifold 109 to a control valve 112. The valve 112 is controlled by the operator of the tractor to admit alternately atmosphere and vacuum to one side of the tractor power cylinder. A conduit 113 connects the control valve 112 to the rear end of power cylinder 106. A conduit 114 connects conduit 113 through the port 25 to chamber 17 of the valve 10, which is shown mounted on the trailer. A conduit 115 connects the conduit 108 to a vacuum reserve tank 116 on the trailer. A branch conduit 117 connects the conduit 115 to the front end of power cylinder 107. A check valve 118 is preferably placed in conduit 115 between the intersection of conduit 115 with conduit 108 and its intersection with conduit 117. Connecting port 29 of chamber 20 of the valve 10 to the conduit 117 is a branch conduit 119. Chambers 18 and 19 of the valve 10 are connected by their respective lines 120 and 121 to an air cleaner 122, open at all times to air at atmospheric pressure. A line 123 connects port 30 of the valve 10 to the rear end of power cylinder 107. Port 28 of valve 10 is connected to the air cleaner 122.

The operation of the power brake hookup shown in Figure 2 will now be described. In released position of the brakes the pistons in power cylinders 106 and 107 are submerged in vacuum, the control valve 10 admits vacuum from the conduit 119 to conduit 123 and the rear end of the tractor power cylinder, and the valve 10 is substantially as shown in Figure 1, with port 28 closed and port 29 open. When the operator wishes to apply the brakes, he pushes a brake pedal (not shown) to crack the valve 112. This results in closing off the vacuum and connecting atmosphere to conduit 113. The atmosphere in the conduit 113 enters the rear end of cylinder 106, creating a pressure differential over the piston of power cylinder 106 and thus moving said piston to apply the tractor brakes.

Part of the air entering into conduit 113 is transmitted to chamber 17 of the universal relay valve 10. Prior to the entry of air into chamber 17, the valve 10 has been in released position. This is true because chambers 17 and 20 have been connected to vacuum, while chambers 18 and 19 have been connected to atmosphere. Since the area of the diaphragms 14 and 15 is approximately equal, the pressure of the air in chamber 18 tending to push diaphragm 15 upward has been balanced by the air pressure in chamber 19 tending to push diaphragm 14 downward. A small spring 124 has helped to hold the valve in released position.

When air enters chamber 17 it unbalances the pressure on rod 21 and the rod begins to move downward. This causes movement of the triangular lever 38 to first close port 29 cutting off the vacuum and then open port 28 admitting air to chamber 20, and thence through port 30 and conduit 123 to the rear end of the trailer power cylinder 107, moving the piston therein to apply the trailer brakes.

It will be noted that the admission of air into chamber 20 will cause an increase of the upward pressure on diaphragm 14, which will eventually equal the downward pressure in chamber 17 and cause rod 21 to discontinue its downward movement. Further actuation of the trailer brakes will then require further actuation of the tractor brakes. Thus the trailer brakes are operated in accordance with the amount of pressure applied to the tractor brakes, and the braking of the two vehicles is proportional.

In case of breakaway, the check valve 118 will prevent diminution of the trailer vacuum reserve. At the same time the breaking of conduit 114 will allow air to enter chamber 17 of the valve 10 and apply the trailer brakes.

Figures 3, 5:
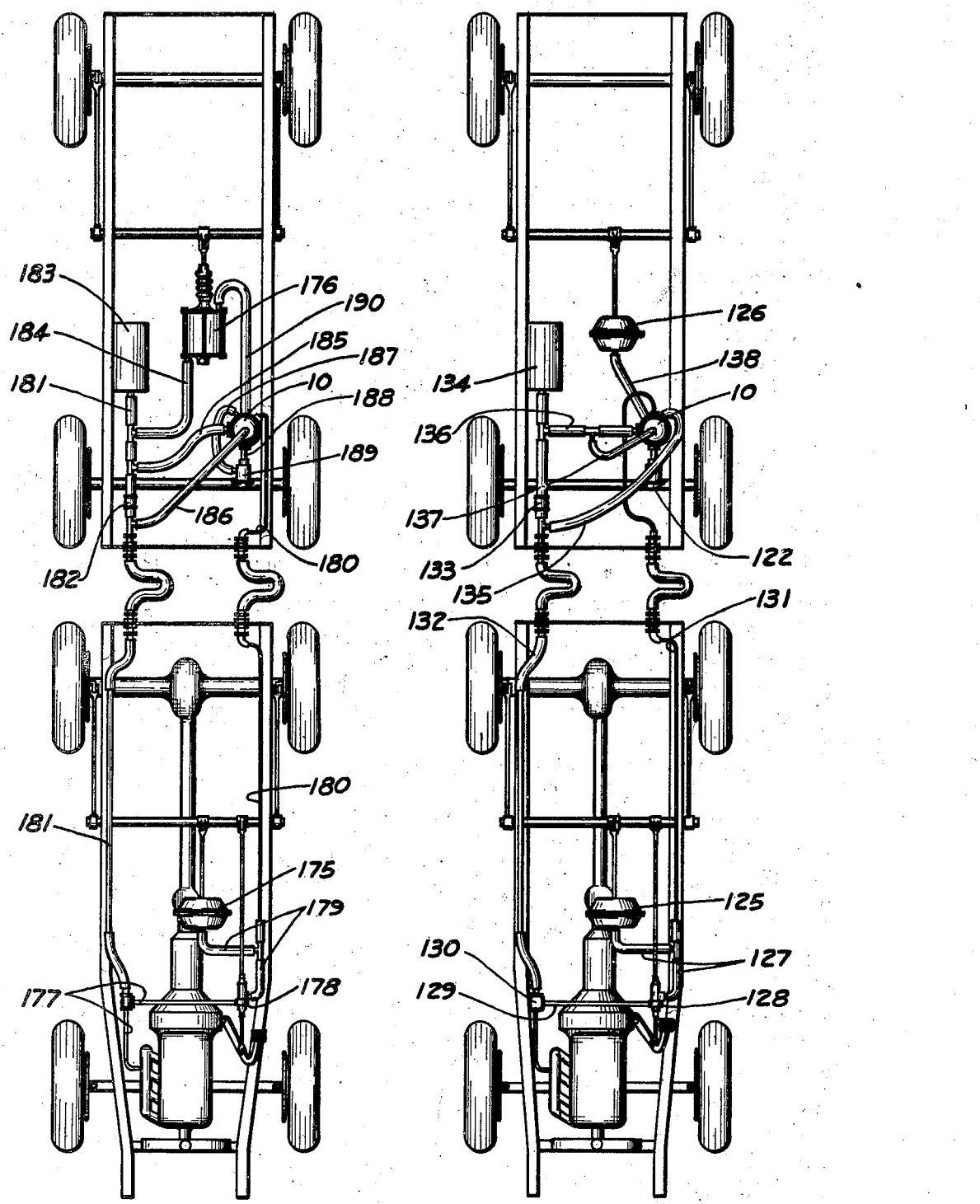
Figure 3 shows an atmospheric to atmospheric tractor-trailer power brake hookup.
Figure 5 shows an atmospheric to vacuum hookup.

Figure 3 shows an atmospheric suspended tractor-atmospheric suspended trailer hookup. In this instance, air suspended power cylinders 125 and 126 are provided to apply the brakes of the tractor and trailer respectively. The cylinder 125 of the tractor is connected by a conduit 127 to a control valve 128, arranged to admit air to conduit 127 when the brakes are released, but to close off the air whenever the brakes are applied and connect conduit 127 to conduit 129 which leads to the manifold of the tractor engine, the preferred source of vacuum. A check valve 130 is placed in the conduit 129. A branch conduit 131 leads from conduit 127 to the chamber 19 of valve 10 on the trailer. A conduit 132, having a check valve 133, extends from conduit 129 to a vacuum reserve tank 134 on the trailer. Conduit 132 has a branch line 135 leading therefrom to chamber 18 of the valve 10, and a second branch line 136 leading to port 29 of the valve 10. The line 135 intersects conduit 132 on the manifold side of the check valve 133, whereas the line 136 intersects conduit 132 on the reserve tank side of the check valve 133. A conduit 137 connects chamber 17 of the valve 10 to the branch line 136. Port 30 of valve 10 is connected by conduit 138 to the front end of the trailer power cylinder, and port 28 of valve 10 is open to atmosphere through the air cleaner 122.

It will be apparent, therefore, that, in this hookup, the chambers of the valve 10 are connected as follows: chamber 17 to the reserve vacuum tank, chamber 18 to the vacuum on the manifold side of the check valve, chamber 19 to the control line, and chamber 20 to air, vacuum and the trailer power cylinder. When the brakes are in released position, the pistons of power cylinders 125 and 126 are suspended in atmosphere, while rod 21 in valve 10 is at its lowermost position, admitting air through ports 28 and 30 to the trailer power cylinder. Rod 21 is held at its lowermost position during brake release because the diaphragm 15 is suspended in vacuum while the air in chamber 19 exerts a downward pressure on diaphragm 14. The downward force will be balanced when sufficient air has been admitted to chamber 20 through port 28 to counteract the air pressure in chamber 19. Actuation of the tractor brakes admits vacuum to conduit 131 and thence to chamber 19 of the valve 10. Since chamber 20 is open to air at atmospheric pressure during the time the trailer brakes remain released, the admission of vacuum to chamber 19 will unbalance the pressures over diaphragm 14 and move the rod 21 upward, closing the air port 28 and opening the vacuum port 29. Vacuum is thus admitted through ports 29 and 30 to the forward end of power cylinder 126, causing the application of the trailer brakes. In this hookup, as in that of Figure 2, the braking of the tractor and trailer vehicles will be proportional, since the same pressure which enters the trailer power cylinder to apply the trailer brakes also exerts a force on the control diaphragm 14 which results eventually in bringing the valve 10 to lapped position and preventing further application of the trailer brakes. In case of breakaway of the trailer from the tractor, check valve 133 prevents instant depletion of the vacuum reserve in the tank 134. At the same time breaking of the conduit 132 admits air through conduit 135 to chamber 18 of the valve 10, unbalancing the pressures over diaphragm 15 and moving the rod 21 upward to cause application of the trailer brakes.

Figure 4 shows a hookup in which a vacuum suspended power cylinder on a tractor is combined with an atmospheric suspended power cylinder on a trailer. The forward end of a vacuum suspended power cylinder 150 on the tractor vehicle is connected by a conduit 151 to the manifold of the tractor engine. Interposed in the conduit 151 is a check valve 152 and connecting the said conduit to a pedal actuated valve 153 is a conduit 154. The valve 153 is connected by a conduit 155 to the rear of the cylinder 150. A branch conduit 156 connects the conduit 151 to a vacuum reserve tank 157 on the trailer on the trailer vehicle, a check valve 158 being interposed in the conduit 156. A branch conduit 159 connects the conduit 155 through port 26 to chamber 18 of the valve 10 on the trailer. An air cleaner 160 on the trailer is connected by conduits 161 and 162 respectively to chamber 19 of the control valve 10 and to port 28 of the valve 10. A branch conduit 163 connects vacuum conduit 156 to port 29 of the valve 10 and a branch conduit 164 connects conduit 163 to port 25. An atmospheric suspended power cylinder 165 on the trailer is connected at its forward end to a conduit 166 which in turn is connected to port 30 of the valve 10.

When used in the hookup of Figure 4, our universal relay valve has the following connections: chamber 17 is connected to the reserve vacuum tank, chamber 18 is connected to the control line, chamber 19 is connected to atmosphere. As long as the trailer brakes remain released, they are suspended in atmosphere and air at atmospheric pressure is present in chamber 20, the rod 21 resting during brake release in its lowermost position. The diaphragm 14 is therefore balanced between two atmospheric chambers and the diaphragm 15 is balanced between two vacuum chambers, since the control line admits vacuum to the chamber 18 so long as the vacuum suspended brakes of the tractor are released. When the pedal on the tractor is actuated to crack the valve 153, air is admitted through the conduit 155 to the rear of the cylinder 150 moving the piston therein to apply the tractor brakes. At the same time air moves through conduits 155 and 159 to chamber 18 of the valve 10, unbalancing the pressures therein and moving the rod 21 upward against the vacuum in chamber 17. The air port 28 is closed by this movement and the vacuum port 29 is open, admitting vacuum to the forward end of the trailer power cylinder 165, and causing application of the trailer brakes. A breakaway of the trailer vehicle from the tractor would break the conduit 159, resulting in the admission of air through the said conduit to the chamber 18 to cause actuation of the trailer brakes.

Figure 5 shows a tractor-trailer hookup in which an atmospheric suspended power cylinder 175 on the tractor and a vacuum suspended power cylinder on the trailer provide the braking power. A conduit 177 connects the manifold of the tractor to the pedal controlled valve 178. The valve 178 is connected by a conduit 179 to the forward end of the power cylinder 175, and a branch conduit 180 connects conduit 179 to chamber 18 of the valve 10. A branch conduit 181, in which is interposed a check valve 182, connects the vacuum line 177 to a vacuum reserve tank 183 on the trailer vehicle. Three branch conduits connect to the conduit 181, a branch conduit 184 connecting the conduit 181 to the forward end of the cylinder 176, a branch conduit 185 connecting the said conduit to port 29 of the control valve 10, and a third branch conduit 186 running from a point on conduit 181 between the manifold and the check valve 182 to chamber 17 of the valve 10. A pair of lines 187 and 188 connect an air cleaner 189 respectively to chamber 19 of the valve 10 and to port 28 of the valve 10. A conduit 190 connects the rearward end of the power cylinder 176 to the port 30 of valve 10. The chambers of the valve 10 are thus connected in this use of applicants' invention as follows: chamber 17 is connected to the vacuum line, chamber 18 is connected to the control line, and chamber 19 is connected to atmosphere.

Operation of this hookup is as follows. During brake release the tractor cylinder is atmospheric suspended and air at atmospheric pressure is therefore admitted to chamber 18 of the valve 10.

At the same time vacuum prevails in chamber 20 owing to the vacuum suspended condition of the trailer power cylinder when the brakes are released. The rod 21 is therefore at its uppermost position when the brakes are released. Since there is vacuum in chambers 17 and 20, and atmosphere in chambers 18 and 19, and since the diaphragms 14 and 15 are equal in area, the pressures in the valve 10 will remain balanced until the tractor brakes are actuated. When the tractor brakes are actuated vacuum is admitted to the forward end of cylinder 175, applying the tractor brakes, and at the same time vacuum is admitted through conduit 180 to chamber 18. This unbalances the pressures in the valve 10 and causes rod 21 to move downward, closing vacuum port 29 and opening air port 28. Air is now admitted through ports 28 and 30 and conduit 190 to the rear of power cylinder 176, applying the trailer brakes. It will be noted that the conduit 186 is connected to the conduit 181 forward of the check valve 182. This connection guarantees that the trailer brakes will be automatically applied in case of breakaway. Air will, if line 186 is broken, rush into chamber 17, causing the rod 21 to move downward and thus function to apply the trailer brakes.

Figure 6:
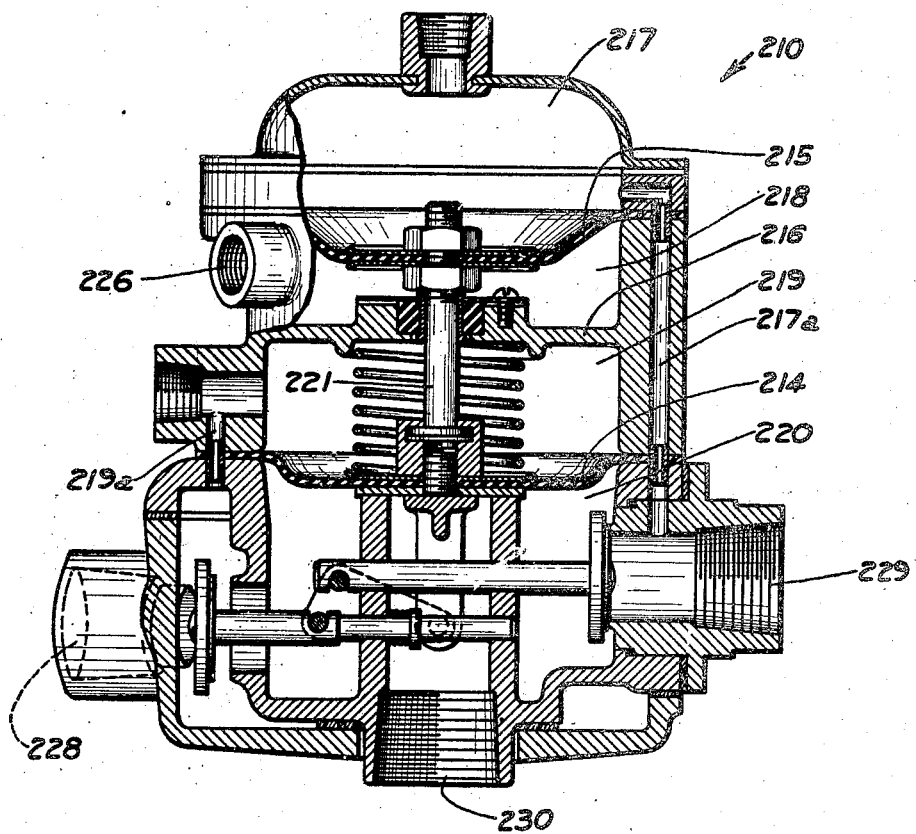
Figure 6 shows a modification of the valve of Figure 1.

Figure 6 shows a modification of the valve of Figure 1. The valve of Figure 6 is generally termed a conversion valve because it functions to change a drop in pressure on the tractor brakes into a rise in pressure on the trailer brakes or vice versa. It is used chiefly with the combination of vacuum suspended tractor brakes and atmospheric suspended trailer brakes.

Since the valve of Figure 6 is in many respects similar to the valve of Figure 1 we will use the same numerals to designate the similar parts with the addition of 200. Thus the valve 210 of Figure 6 is divided by diaphragms 214 and 215 and a metal partition 216 into four chambers—217, 218, 219 and 220. Chamber 220 is provided with an air port 228, a vacuum port 229 and a port 230 which is connected to the trailer power motor. The valve 210 is internally ported, having a passage 217a which connects the chamber 217 with the vacuum port 229, and having a passage 219a which connects the chamber 219 with the air port 228. The chamber 218 is connected by a port 226 to the control line from the tractor power brakes.

Assuming that the valve is to be used with a vacuum suspended tractor-atmospheric suspended trailer hookup, during brake release rod 221 will be in its lowermost position, chamber 218 will be maintained in vacuum from the control line, and chamber 220 will be open to air at atmospheric pressure. Thus diaphragm 215 will be balanced between the vacuum in chamber 217 and that in chamber 218, while the diaphragm 214 will be balanced between the atmospheric pressure present in chamber 219 and the atmospheric pressure of chamber 220. Actuation of the tractor brakes will cause air to be admitted to chamber 218, unbalancing the forces over diaphragm 215 and moving rod 221 upward to first close the air port 228 and subsequently open the vacuum port 229 admitting vacuum to the trailer power cylinder to apply the trailer brakes. In case of breakaway, the control line will be broken and air will be admitted to chamber 218 causing application of the trailer brakes.

If the valve 210 is used with an atmospheric suspended tractor-vacuum suspended trailer hookup the connections will be the same as those described for the vacuum suspended tractor-atmospheric suspended trailer hookup. However, the rod 221 will be maintained in its uppermost position during brake release. Under this condition vacuum will be present in chambers 217 and 220, and atmosphere will be present in chambers 218 and 219. Actuation of the tractor brakes will cause the admission of vacuum to chamber 218, which will in turn cause rod 221 to move downward closing vacuum port 229, opening air port 228 and admitting air to the trailer power cylinder to apply the trailer brakes. The valve will be balanced, i. e., in lapped position, when the downward pull of the vacuum in chamber 218 plus the downward pressure of the atmosphere in chamber 219 is equal to the upward pull of the vacuum in chamber 217 plus the upward push of the atmospheric pressure in chamber 220.

While we have described two specific embodiments of our invention, it is not our intention to be limited in scope to the particular embodiments described nor to be limited otherwise than by the terms of the appended claims.

We claim:

1. A valve for correlating the operation of vacuum brakes comprising a casing provided with four chambers, a flexible diaphragm placed between two of said chambers, a second flexible diaphragm placed between the other two of said chambers, means for maintaining one of said chambers under control line pressure, means for maintaining another of said chambers under controlled pressure, a floating control element connected to each of said diaphragms and movable therewith when the diaphragms flex owing to variations in pressure in the said chambers, a floating lever attached to the floating control element, and a pair of poppet type valve elements controlled by said floating lever.

2. A valve for correlating the operation of vacuum brakes comprising a casing provided with four chambers, a flexible diaphragm placed between two of said chambers, a second flexible diaphragm placed between the other two of said chambers, means for maintaining one of said chambers under control line pressure, means for maintaining another of said chambers under controlled pressure, a floating control element connected to each of said diaphragms and movable therewith when the diaphragms flex owing to variations in pressure in the said chambers, a pair of poppet type valve elements controlled by said floating control element, an atmospheric port controlled by one of said valve elements, and a vacuum port controlled by the other of said valve elements.

3. A valve for correlating the operation of vacuum brakes comprising a casing provided with four chambers, a flexible diaphragm placed between two of said chambers, a second flexible diaphragm placed between the other two of said chambers, means for maintaining one of said chambers under control line pressure, means for maintaining another of said chambers under controlled pressure, a floating control element connected to each of said diaphragms and movable therewith when the diaphragms flex owing to variations in pressure in the said chambers, a pair of poppet type valve elements controlled by said floating control element, an atmospheric port controlled by one of said valve elements, and a vacuum port controlled by the other of said valve elements, each of said valve elements moving to seal its associated port in a direction corresponding to the direction of force exerted by the pressures prevailing at the said ports.

4. A valve for correlating the operation of vacuum motors comprising a casing having a plurality of passages and a plurality of chambers including a vacuum chamber, an atmospheric chamber, a chamber connected to a control line, and a chamber connected to a controlled motor, one of said passages connecting the vacuum chamber to a source of vacuum, a flexible diaphragm between the atmospheric chamber and the chamber connected to a controlled motor, and a second flexible diaphragm between the vacuum chamber and the chamber connected to a control line.

5. A valve for correlating the operation of vacuum motors comprising a casing having a plurality of passages and a plurality of chambers including a vacuum chamber, an atmospheric chamber, a chamber connected to a control line, and a chamber connected to a controlled motor, one of said passages connecting the vacuum chamber to a source of vacuum, another of said passages connecting the atmospheric chamber to atmosphere, a flexible diaphragm between the atmospheric chamber and the chamber connected to a controlled motor, and a second flexible diaphragm between the vacuum chamber and the chamber connected to a control line.

6. In combination with a truck and trailer each provided with a servo motor brake of the fluid pressure vacuum operated type, a source of vacuum, a main control valve on the truck, means including said valve for controlling the servo motor brake on the truck, a relay valve on the trailer connected to said main control valve and means including said relay valve for controlling the servo motor brake on the trailer, said relay valve compresing a casing having a pair of valve seats arranged on opposite sides of the casing, a pair of poppet valves for co-action with said seats, oppositely directed stems on the valve extending across the casing in parallel relation with each other, a floating lever connected to the stems, means for operating said lever for first closing one valve and then opening the other, and pressure responsive means for actuating said operating means in accordance with the relative values of four fluid pressures, of which one corresponds to the pressure of said main control valve, another to the pressure in the valve port connected to the trailer servo motor, another to the pressure of the source of vacuum, and a fourth to atmospheric pressure.

7. In combination, a universal control valve for the trailer of a truck-trailer fluid pressure braking equipment, a source of fluid pressure, a brake on said trailer, a servo motor for operating said brake in accordance with adjustment of said valve, a main control valve on the truck to operate the brake by said servo motor, a control pressure line extending from said control valve on the truck to said valve on the trailer, said universal control valve having a plurality of ports, a plurality of poppet valve elements for controlling the passing of pressure fluid through said ports, and a movable element for opening and closing said ports in response to variations in pressure in said control line, in said servo motor and in said source of fluid pressure to energize the servo motor to apply the brake upon either a decrease or an increase in the pressure in said control line depending upon the connection of the said valve in the system.

8. In combination with a truck and trailer each provided with a servo motor brake of the fluid pressure vacuum operated type, a source of vacuum, a main control valve on the truck, means including said valve for controlling the servo motor brake on the truck, a relay valve on the trailer connected to said main control valve, and means including said relay valve for controlling the servo motor brake on the trailer, said relay valve comprising a casing having a pair of valve seats, a pair of poppet valves for co-action with said seats, a floating lever connected to the valves, means for operating said lever for first closing one valve and then opening the other, and pressure responsive means for actuating said operating means in accordance with the relative values of four fluid pressures, of which one corresponds to the pressure of said main control valve, another to the pressure in the valve port connected to the trailer servo motor, another to the pressure of the source of vacuum, and a fourth to atmospheric pressure.

9. In combination with a truck and trailer each provided with a servo motor brake of the fluid pressure vacuum operated type, a source of vacuum, a main control valve on the truck, means including said valve for controlling the servo motor brake on the truck, a relay valve on the trailer connected to said main control valve, and means including said relay valve for controlling the servo motor brake on the trailer, said relay valve comprising a casing having an atmospheric port and a vacuum port, a pair of valve members for controlling the atmospheric and vacuum ports, a floating lever connected to the valve members, means for controlling the floating lever to open and close said ports, and pressure responsive means for actuating said last-named means in accordance with the relative values of four fluid pressures, of which one corresponds to the pressure of said main control valve, another to the pressure in the valve port connected to the trailer servo motor, another to the pressure of the source of vacuum, and a fourth to atmospheric pressure.

10. In combination, a universal control valve for the trailer of a truck-trailer fluid pressure braking equipment, a source of fluid pressure, a brake on said trailer, a servo motor for operating said brake in accordance with adjustment of said valve, a main control valve on the truck to operate the brake by said servo motor, a control pressure line extending from said control valve on the truck to said valve on the trailer, said universal control valve having four pressure chambers each of which is disconnected from all the other chambers and having a plurality of ports and a movable element for opening and closing said ports in response to variations in pressure in said control line, in said servo motor and in said source of fluid pressure to energize the servo motor to apply the brake upon either a decrease or an increase in the pressure in said control line depending upon the connection of the said valve in the system.

HENRY BAADE.
THOMAS H. THOMAS.